(12) United States Patent
Schmidt (10) Patent No.: US 7,354,049 B2
(45) Date of Patent: Apr. 8, 2008

(54) INFANT CARRYING SYSTEM (76) Inventor: Tim Schmidt, 5107 Upper Mount Row, New Albany, OH (US) 43054

( * ) Notice: Subject to any disclaimer, the term of this patent is extended or adjusted under 35 U.S.C. 154(b) by 386 days.

(21) Appl. No.: 10/993,073

(22) Filed: Nov. 19, 2004

(65) Prior Publication Data
US 2005/0104333 A1 May 19, 2005

Related U.S. Application Data (60) Provisional application No. 60/523,254, filed on Nov. 19, 2003.

(51) Int. Cl.
B60R 21/32 (2006.01)
(52) U.S. Cl. .................. 280/33.993; 280/47.25
(58) Field of Classification Search ........... 280/33.993, 280/47.25, 47.38, 63, 47.371, 30, 35
See application file for complete search history.

(56) References Cited

U.S. PATENT DOCUMENTS

| 4,747,526 | A |   | 5/1988  | Launes |
|-----------|---|---|---------|--------|
| 5,285,935 | A |   | 2/1994  | Hsueh |
| 5,374,073 | A |   | 12/1994 | Hung-Hsin |
| 5,478,096 | A |   | 12/1995 | Ting |
| 5,507,508 | A |   | 4/1996  | Liang |
| 5,593,008 | A |   | 1/1997  | Magnusson |
| 5,695,246 | A |   | 12/1997 | Tsai |
| 5,730,490 | A | * | 3/1998  | Mortenson ............. 297/184.13 |
| 5,806,924 | A | * | 9/1998  | Gonas ................... 297/216.11 |
| 5,899,467 | A |   | 5/1999  | Henkel |
| 5,947,555 | A | * | 9/1999  | Welsh et al. ................ 297/130 |
| 5,957,349 | A |   | 9/1999  | Krulik |
| 5,975,558 | A | * | 11/1999 | Sittu ......................... 280/647 |
| 6,012,756 | A | * | 1/2000  | Clark-Dickson ........... 296/77.1 |
| 6,056,355 | A | * | 5/2000  | Klassen .................. 297/184.13 |
| 6,209,953 | B1 | * | 4/2001 | Mackay et al. ......... 297/184.13 |
| 6,217,099 | B1 | * | 4/2001 | McKinney et al. ......... 296/77.1 |
| 6,224,073 | B1 | * | 5/2001 | Au .......................... 280/47.38 |
| 6,241,313 | B1 |   | 6/2001 | Lenz |
| 6,367,821 | B2 | * | 4/2002 | Thiele ......................... 280/30 |
| D459,883  | S  |   | 7/2002 | Worrell |
| 6,463,604 | B1 |   | 10/2002 | Reveron |
| 6,547,324 | B1 |   | 4/2003 | Ammann |
| 6,581,945 | B1 |   | 6/2003 | Shapiro |
| 6,854,744 | B2 | * | 2/2005 | Brandler ...................... 280/30 |

* cited by examiner

Primary Examiner—Christopher P. Ellis
Assistant Examiner—Brian L Swenson
(74) Attorney, Agent, or Firm—Porter, Wright, Morris & Arthur, LLP (57) ABSTRACT An infant carrying system including a bag defining an interior compartment and having an opening for selectively providing access to the interior compartment. A pair of wheels are rotatably attached to the bag so that the bag can be rolled along the ground. A handle is attached to the bag so that the bag can be moved by rolling the wheels along the ground. An attachment is provided for removably securing a child seat at least partially located within the interior compartment and facing the opening. Whereby the bag is moved while a child is secured in the child seat which is secured in the bag and the bag is also used to store and carry the empty child seat or other items.

18 Claims, 7 Drawing Sheets

INFANT CARRYING SYSTEM

CROSS-REFERENCE TO RELATED APPLICATIONS

This application claims the priority benefit of U.S. Provisional Patent Application No. 60/523,254 filed on Nov. 19, 2003, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a device for carrying an infant or child and, more particularly, to such a device which is easily stowable for travel.

BACKGROUND OF THE INVENTION

When traveling, parents of very young children or infants often must carry their children while rushing through airports. This is often balanced against also carrying a diaper bag, overnight bag, brief case, purse, computer case, and/or any other carry on items. This juggling act can often be difficult if not impossible.

One solution is to utilize a baby stroller which is typically collapsible for compact storage. However, most baby strollers are too long to fit under a seat or into an overhead bin of a commercial aircraft. Therefore, most commercial airlines do not permit baby strollers to be carried onto an airplane as carry-on luggage. Therefore, the baby stroller must be checked at the gate or sooner.

Another solution has been to provide a wheeled carry-on suitcase or luggage with a seat on which a child can be seated and secured. For example, see U.S. Pat. Nos. 5,988,657, 5,899,467, and 6,241,313, the disclosures of which are expressly incorporated herein in their entirety by reference. However, an infant or very small child that is too young to sit up still cannot use such a seat. Additionally, the luggage cannot be used as a car seat and thus a separate car seat must be checked as additional baggage or otherwise available at the final destination of the flight. Accordingly, there is a need in the art for an improved infant carrying system which can easily be carried onboard an aircraft or the like.

SUMMARY OF THE INVENTION

The present invention provides an infant carrying system which solves at least some of the above-noted problems. In accordance with one aspect of the present invention, an infant carrying system includes, in combination, a bag defining an interior compartment and having an opening for selectively providing access to the interior compartment. A pair of wheels are rotatably attached to the bag so that the bag can be rolled along the ground. A handle is attached to the bag to move the bag by rolling the wheels along the ground. An attachment is provided for removably securing a child seat at least partially located within the interior compartment and facing the opening. Whereby the bag is moved while a child is secured in the child seat.

According to another aspect of the present invention, an infant carrying system including, in combination, a bag defining an interior compartment and having an opening formed in the top of the bag for selectively providing access to the interior compartment. The bag has a rigid bottom and flexible sides so that the bag can be folded between storage and use configurations. A pair of wheels are rotatably attached to a first end of the bag so that the bag can be rolled along the ground. The pair of wheels are movable between extended and retracted positions. A handle is attached to a second end of the bag opposite the first end of the bag to move the bag by rolling the wheels along the ground. The handle is movable between extended and retracted positions. An attachment is provided for removably securing a child seat at least partially located within the interior compartment and facing the opening. Whereby the bag is moved while a child is secured in the child seat.

According to yet another aspect of the present invention, an infant carrying system including, in combination, a bag defining an interior compartment and having an opening formed in the top of the bag for selectively providing access to the interior compartment. The bag has a bottom and sides molded of plastic. A pair of wheels are rotatably attached to the bag so that the bag can be rolled along the ground. A handle is attached to the bag to move the bag by rolling the wheels along the ground. The handle is movable between extended and retracted positions. The handle and the pair of wheels are each located at a rear end of the bag. An attachment is provided for removably securing a child seat at least partially located within the interior compartment and facing the opening. Whereby the bag is moved while a child is secured in the child seat.

From the foregoing disclosure and the following more detailed description of various preferred embodiments it will be apparent to those skilled in the art that the present invention provides a significant advance in the technology and art of infant carrying systems. Particularly significant in this regard is the potential the invention affords for providing a high quality, easy to operate, reliable, and inexpensive device. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

It should be understood that the appended drawings are not necessarily to scale, presenting a somewhat simplified representation of various preferred features illustrative of the basic principles of the invention. The specific design features of an infant carrying system as disclosed herein, including, for example, specific dimensions, orientations, and shapes of the bag and infant carrier will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the infant carrying system illustrated in the drawings. In general, front or forward refers to a direction in which a child in the child seat is facing, that is, a rightward direction in FIG. 1 which is away from a pull handle end and toward a wheeled end of the illustrated bag. In general, rear or rearward refers to a direction which is opposite to the direction in which a child located in the child seat is facing, that is, a leftward direction in FIG. 1 which is toward a pull handle end and away from a wheeled end of the illustrated bag. Also in general, up or upward refers to an upward direction within the plane of the paper in FIG. 1 which is away from a closed bottom and toward an open top of the illustrated bag, and down or downward refers to an downward direction within the plane of the paper in FIG. 1 which is away from an open top and toward a closed bottom of the illustrated bag.

DETAILED DESCRIPTION OF CERTAIN PREFERRED EMBODIMENTS

It will be apparent to those skilled in the art, that is, to those who have knowledge or experience in this area of technology, that many uses and design variations are possible for the infant carrying system disclosed herein. The following detailed discussion of various alternative and preferred embodiments will illustrate the general principles of the invention with reference to a system which has an attachment to secure an off-the-shelf child carrier or seat. Other embodiments suitable for other applications will be apparent to those skilled in the art given the benefit of this disclosure such as, for example, systems which have attachments to permanently secure a child carrier or seat within the bag or systems with attachments to secure a specially adapted child carrier or seat.

FIGS. 1 to 4 illustrate an infant carrying system 10 according to a first embodiment of the present invention. The illustrated infant carrying system 10 includes a bag 12 having an interior compartment 14 and a child carrier or seat 16 removably secured at least partially within the interior compartment 14. An infant or child 18 can- be secured in the child seat 16 so that the child 18 can be easily and safely transported.

Figure 1:
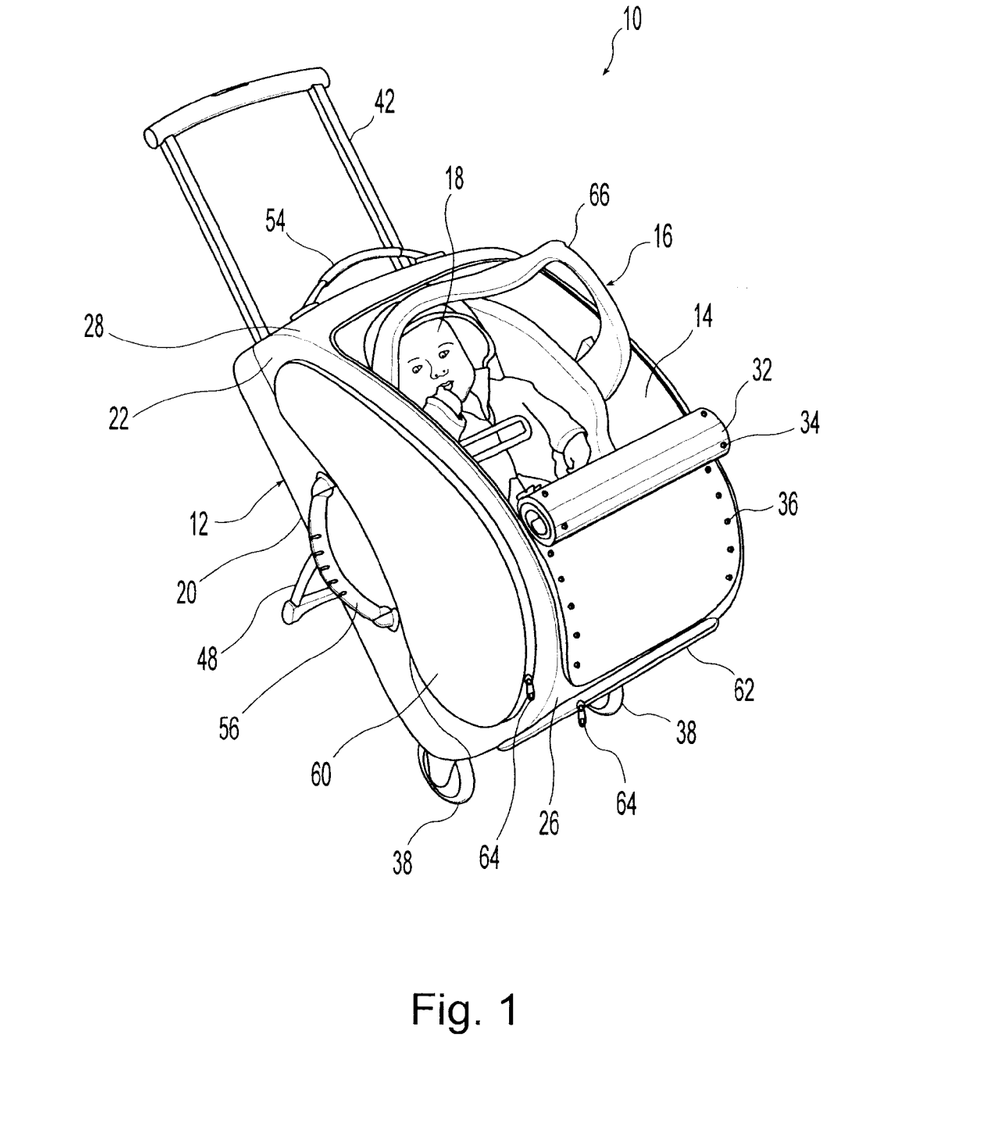
FIG. 1 is a top perspective view of an infant carrying system according to a first embodiment of the present invention.
Figures 2, 3, 4:
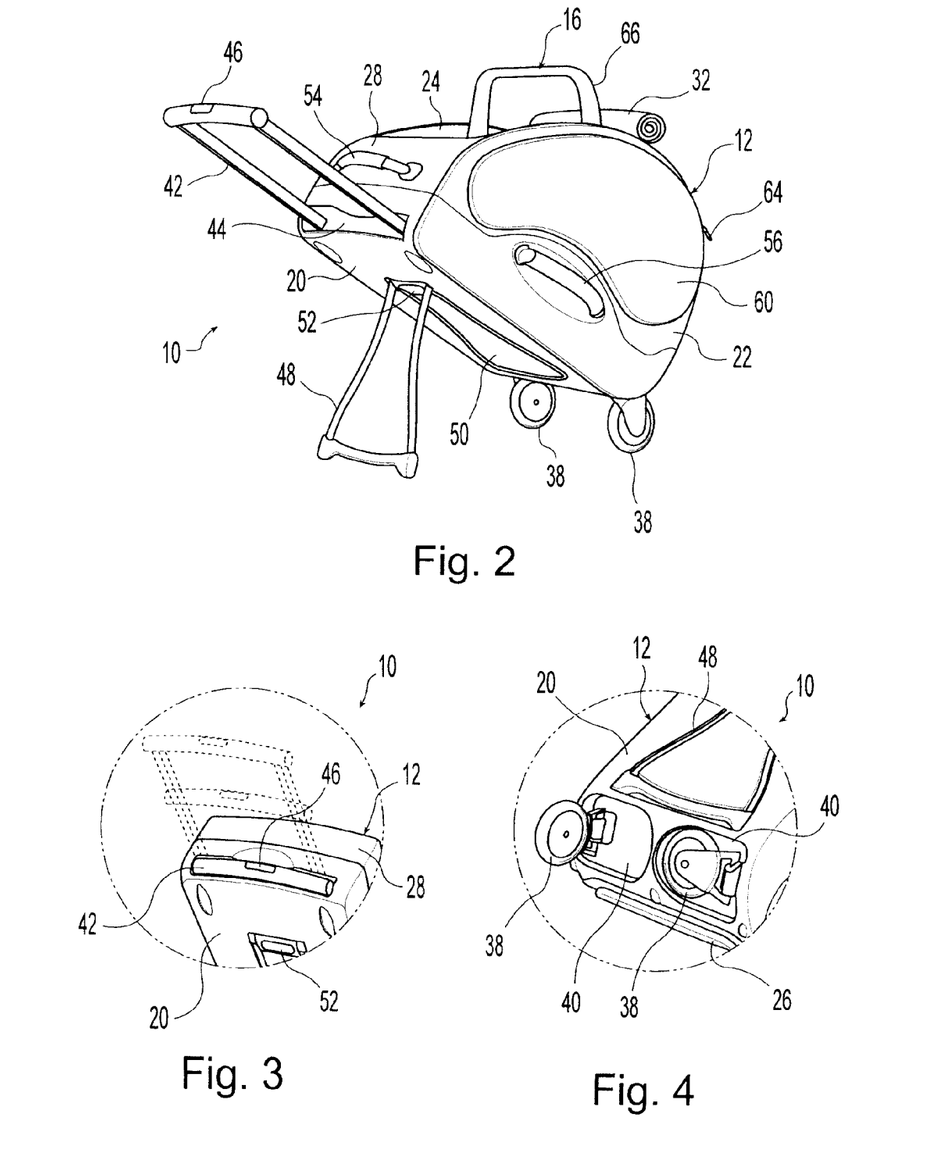
FIG. 2 is a bottom perspective view of the infant carrying system of FIG. 1.
FIG. 3 is a fragmented perspective view of the infant carrying system of FIGS. 1 and 2 showing a stowable pull handle.
FIG. 4 is a fragmented perspective view of the infant carrying system of FIGS. 1 to 3 showing stowable wheels and a stowable support or stand.

The illustrated bag 12 has a relatively rigid bottom 20 and relatively flexible sides 22, 24 and ends 26, 28 so that the bag 12 can be folded for storage when the child seat 16 is removed. The bottom 20 is preferably molded of a durable plastic but any other suitable material can alternatively be utilized. The sides 22, 24 and the ends 26, 28 are preferably formed of nylon fabric but any other suitable material can alternatively be utilized. It is noted that the bag 12 can alternatively have any other combination of flexible or rigid components such as, for example, entirely rigid or entirely flexible. The interior surface of the bottom 20, that is, the bottom surface of the interior compartment 14 is preferably provided with rubber skids or other suitable high coefficient friction or non-skid gripping surface to reduce relative movement between the child seat 16 and the bag 12.

The top of the illustrated bag 12 is provided with an opening 30 which extends in a longitudinal direction for substantially the entire length of the bag 12 and extends in a lateral direction for substantially the entire width of the bag 12. The illustrated opening 30 is generally rectangular-shaped but any other suitable shape can alternatively be utilized. The illustrated opening 30 is sized for passage of the child seat 16 therethrough when installing the child seat 16 into the interior compartment 14 or removing the child seat 16 from the interior compartment 14. The opening 30 is preferably provided with a top cover or closure 32 for selectively opening and closing the opening 30. The closure 32 is provided with a releasable fastener 34 such as, for example, the illustrated zipper. It is noted, however, that any other suitable fastener 34 can be utilized within the scope of the present invention such as, for example, snaps, hook and loop fasteners, buttons, straps, ties, buckles, clasps, and the like. The illustrated closure 32 is formed of a nylon fabric which is easy to clean and comes in a variety of suitable colors and patterns but it is noted that the closure 32 can alternatively be formed of any other suitable material. The illustrated closure 32 is flexible so that it can be rolled and unrolled as it is opened and closed and is provided with a retainer 36 to secure the rolled closure 32 in any desired position. The illustrated retainer 36 is in the form of a plurality of spaced-apart snaps located along lateral edges of the closure 32. It is noted, however, that alternatively any other suitable type of retainer 36 can be utilized such as, for example, zippers, hook and loop fasteners, buttons, straps, ties, buckles, clasps, and the like.

The illustrated bag 12 is provided with a pair of laterally spaced-apart wheels 38 which are located at the forward end of the bag bottom 20. The wheels 38 are rotatably attached to the bag 12 so that the bag 12 can be rolled along the ground. The illustrated wheels 38 rotate about a common horizontal, laterally extending rotational axis. The wheels 38 are preferably sized and positioned so that the bag 12 has a relatively high ground clearance when the bag 12 is supported on the ground by the wheels 38. The wheels 38 are preferably formed of a relatively soft and anti-slip material.

The wheels 38 are preferably retractable or movable between an extended position wherein the wheels 38 can be used to roll the bag 12 and a retracted position wherein the wheels 38 are stored. The illustrated wheels 38 independently pivot between the extended and retracted positions. The illustrated bag bottom 20 has recesses 40 formed therein for receiving the wheels 38 when the wheels 38 are in the retracted or storage position so that the bottom 20 is relatively smooth. When the wheels 38 are in their retracted position.

The illustrated bag 12 is provided with a pull handle 42 at the rear end of the bag 12 opposite the wheels 38 so that a user can lift the pull handle 42 to lift the rear end of the bag 12 and balance the bag 12 on the wheels 38 so that they can pull or push the pull handle 42 to roll the wheels 38 along the ground to move the bag 12. The pull handle 42 is preferably retractable or adjustable between an extended position wherein the pull handle 42 is away from the bag 12 so that it can be used to move the bag 12 and a retracted position where the pull handle 42 is adjacent the bag 12 for storage. The illustrated bag bottom 20 has recesses 44 formed therein for receiving the pull handle 42 when the pull handle 42 is in its retracted or storage position. The pull handle 42 is preferably provided with a lock to secure the pull handle in at least the extended position and a manually-operated release 46 such as, for example, the illustrated push button release for selectively releasing the lock when it is desired to change the position of the pull handle 42. The pull handle 42 preferably has a width which extends nearly the full width of the bag 12.

The illustrated bag 12 is provided with a stand or support 48 at the bottom 20 of the 12 bag so that the bag 12 can be propped up at a desired angle. The stand 48 is preferably retractable or adjustable between an extended position wherein the stand 48 is away from the bag bottom 20 so that it can be used to prop up the bag 12 and a retracted position where the stand 48 is adjacent the bag bottom 20 for storage. The illustrated bag bottom 20 has recesses 50 formed therein for receiving the stand 48 when the stand 48 is in the retracted or storage position so that the bottom 20 is relatively smooth when the stand 48 is in its retracted position. The stand 48 is preferably provided with a lock to secure the stand in at least the extended position and a manually-operated release 52 such as, for example, the illustrated push button release for selectively releasing the lock when it is desired to change the position of the stand 48.

The illustrated bag 12 also includes first and second carry handles 54, 56 so that the bag 12 can be carried above the ground. The illustrated first or end carry handle 54 extends from the rear end 28 of the bag 12, that is, near the pull handle 42 and opposite the wheels 38. The first handle 54 is configured near a lateral center of the bag 12 so that the bag 12 can be lifted and carried by the first handle 54. The illustrated second or side carry handle 56 extends from the right side 22 of the bag 12, that is, between the pull handle 42 and the wheels 38. The second handle 56 is configured near a longitudinal center of the bag 12 so that the bag 12 can be lifted and carried by the second handle 56. Preferably, the bag 12 includes straps or a harness 58 (best shown in FIG. 5F) which permit the bag 12 to be carried as a backpack.

The illustrated bag 12 also includes a plurality exterior pockets 60, 62 which form auxiliary or exterior compartments for storage of items such as a diaper bag, toys, or the like. The illustrated bag 12 includes side pockets 60 which are substantially the same size as the sides 22, 24 of the bag 12 and a front pocket 62 which is substantially the same size as the front end 26 of the bag 12. It is noted that any other quantity, size, or location of external pockets 60, 62 can be utilized. Each of the pockets 60, 62 are preferably provided a selectively releasable fastener 64 such as, for example, the illustrated zipper. It is noted, however, that any other suitable fastener 64 can be utilized within the scope of the present invention such as, for example, snaps, hook and loop fasteners, buttons, straps, ties, buckles, clasps, and the like.

The illustrated child carrier or seat 16 is an off-the-shelf child seat or infant carrier which is certified to be utilized as a child seat within an automobile. The illustrated child seat 16 is available from Graco Children's Products, Inc. of Exton, Pa. but any other suitable child seat 16 can alternatively be utilized. The illustrated child seat 16 includes a rigid handle 66 which pivots between a carrying position wherein it extends upward between lateral sides of the child seat 16 so that it extends over the child 18 and can be used to carry the child seat 16 (best shown in FIG. 1) and a storage position wherein it is located down adjacent the a head end of child seat 16 so that there is easy access to insert and remove the child 18 (best shown in FIG. 5F).

The child seat 16 is removably secured to the bag 12 so that the child seat 16 is located at least partially within the interior compartment 14 of the bag 12 and facing the opening 30. Preferably, the child seat 16 is substantially within the bag 12. The illustrated bag 12 is sized such that the internal compartment 14 holds the entire child seat 16 except for an upper portion of the handle 66 when the handle 66 is in the carrying position and holds the entire child seat 16 including the entire handle 66 when the handle 66 is in the carrying position. The bag 12 is provided with an attachment 68 within the bag 12 to secure the child seat 16 to the bag 12. The attachment 68 preferably includes an internal support structure and a harness or strap. The illustrated attachment 68 includes a nylon strap of adjustable length and a releasable clasp or buckle. When needed, the support structure can provide stability and stiffness to the bag 12. The strap can operate similar to the way a seatbelt secures the child seat 16 to an automobile seat. The strap is preferably of adjustable length so that different off-the-shelf child seats 16 can be utilized without modifications to the child seat 16 or the bag 12.

Figure 5A:
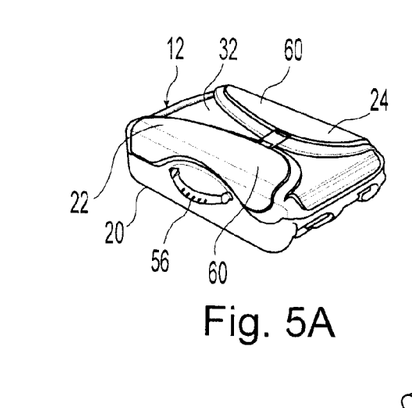
FIGS. 5A to 5G are perspective views of the infant carrying system of FIGS. 1 to 4 showing conversion from a stowable or storage configuration to a infant carrying configuration.
Figure 5B:
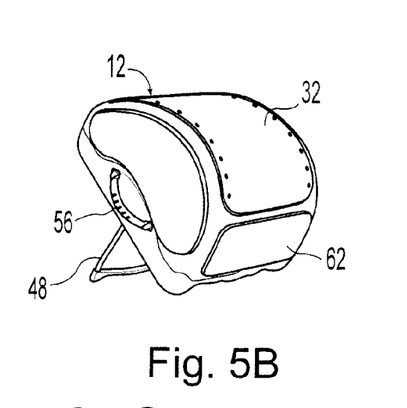
Figure 5C:
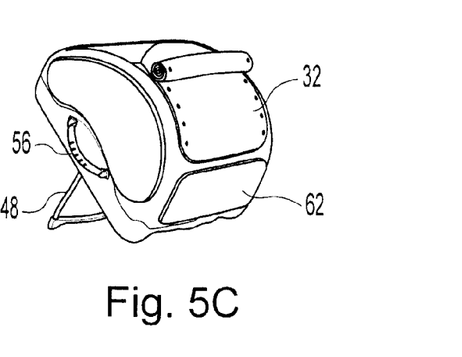
Figure 5D:
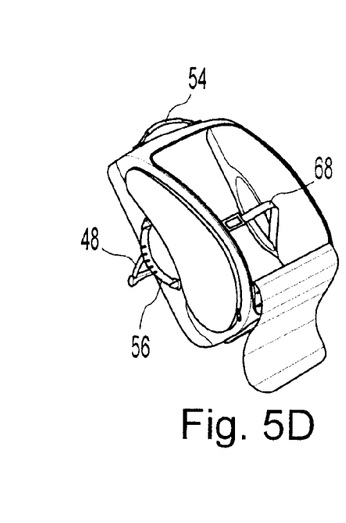
Figure 5E:
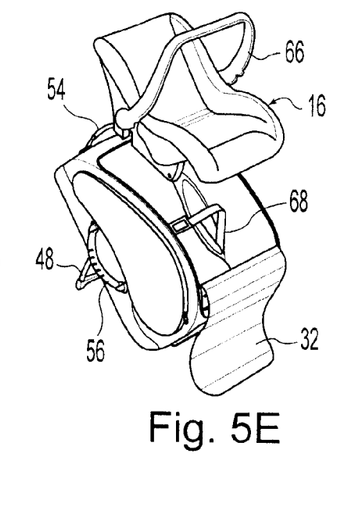
Figure 5F:
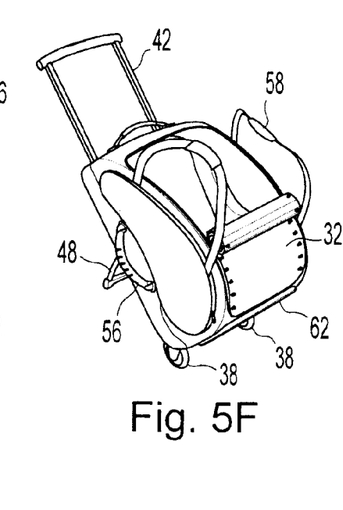
Figure 5G:
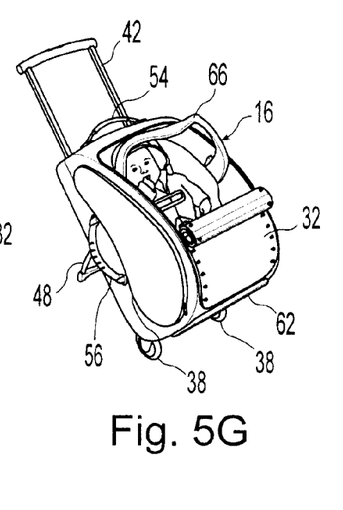
Figure 6:
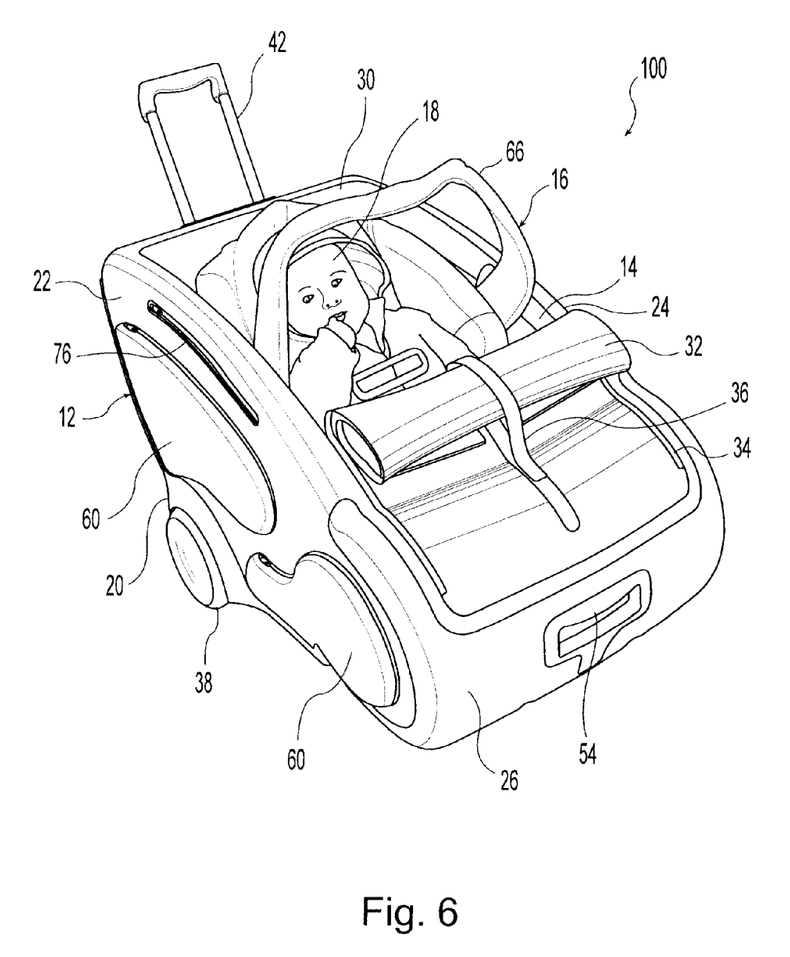
FIG. 6 is a top perspective view of an infant carrying system according to a second embodiment of the present invention.

As best shown in FIGS. 5A to 5G, the bag 12 is easily converted from a storage configuration to a use configuration. In the storage configuration, the sides 22, 24 and the ends 26, 28 of the bag 12 are folded so that the height of the bag 12 is reduced. The bag 12 preferably includes a fastener 70 for securing the sides 22, 24 and the ends 26, 28 in the folded storage configuration. The illustrated bag 12 has the fastener 70 in the form of a buckle but alternatively any other suitable type of fastener 70 can be utilized such as, for example, zippers, hook and loop fasteners, buttons, straps, ties, snaps, clasps, and the like. As best shown in FIG. 5B, when the infant carrier system 10 is to be used for carrying a child 18, the fastener 70 is undone so that the sides 22, 24 and the ends 26, 28 of the bag 12 resiliently expand. The stand 48 is moved from its storage position to its extended position so that the bag 12 can be propped to its desired inclination for the child 18. As best shown in FIGS. 5C and 5D, the closure 32 is then opened to expose the opening 30 and the straps of the internal attachment 68 are adjusted to secure the inner frame of the child seat 16. As best shown, in FIG. 5E., the child seat 16 is placed into the bag 12 through the opening 30 and is secured to the bag 12 by clasping and adjusting the straps of the attachment 68. As best shown in FIG. 5F, the pull handle 42 is moved from its retracted to its extended position and the child seat handle 66 is moved to its storage position to provide access to the child seat 16. Additionally, the closure 32 is rolled to its desired position and secured by the retainer 36. As best shown in FIG. 5G, the baby or child 18 is secured in the child seat 16 and the child seat handle 66 is returned to its carrying position for additional safety if desired. The child 18 is then moved by pushing or pulling on the pull handle 42 to roll the bag 12 along the ground. Once at a desired location, the child 18 can be removed from the child seat 16, the seat handle 66 pivoted to its storage position, and the closure 32 closed to secure the child seat 16 entirely within the bag 12. The bag 12 can then be stowed in any desired place such as an overhead bin in an aircraft or the trunk of a automobile. Additionally, the child seat 16 can be unattached and removed from the bag 12 if the child seat 16 is to be utilized with a seat in the aircraft or automobile. Furthermore, the child seat 16 can be removed if the bag 12 is to be used as typical luggage to carry items other than the child 18.

FIGS. 6 to 12 illustrate an infant carrying system 100 according to a second embodiment of the present invention wherein like reference numbers are utilized for like structure. The illustrated infant carrying system 100 of the second embodiment is substantially the same as the infant carrying system 10 of the first embodiment except that the second embodiment illustrates that the sides 22, 24 and the ends 26, 28 of the bag 12 can be substantially rigid.

Figure 10:
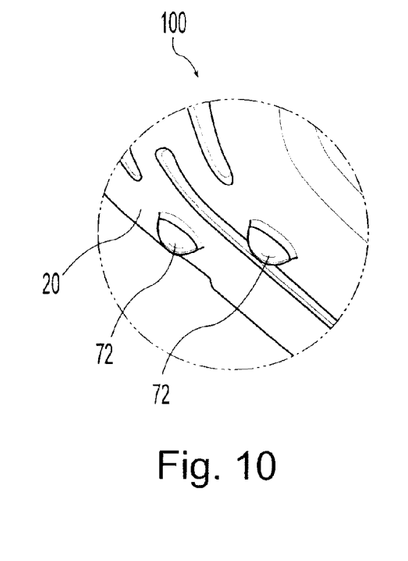
FIG. 10 is a fragmented perspective view of the infant carrying system of FIGS. 6 to 9 showing bottom bumper pads or stands.
Figure 11:
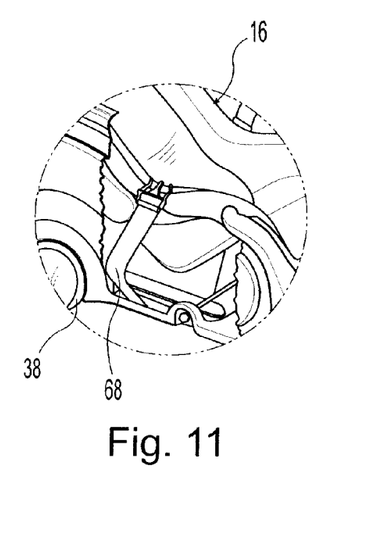
FIG. 11 is a fragmented perspective view of the infant carrying system of FIGS. 6 to 10 showing a universal child seat attachment.

The illustrated bag 12 has a relatively rigid bottom 20, sides 22, 24, and ends 26, 28 so that the bag 12 is entirely rigid except for the closure 32. The bottom 20, sides 22, 24, and ends 26, 28 are preferably molded of a durable plastic such as, for example, a compression molded foam but any other suitable material can alternatively be utilized. The wheels 38 are located at the rear end 28 of the bag bottom 20 that is, at the same end as the pull handle 42. Thus, to move the bag 12, the user pushes down on the pull handle 42 to tilt the front end of the bag 12 off of the ground and then pulls or pushes the pull handle 42 to roll the bag 12 over the ground. The illustrated bag bottom 20 is provided with bumper pads or stands 72 near the front end 26 to provide an anti-roll feature (as best shown in FIG. 10). It is noted that with the wheels 38 located in this manner, the stand 48 is preferably eliminated.

Figure 7:
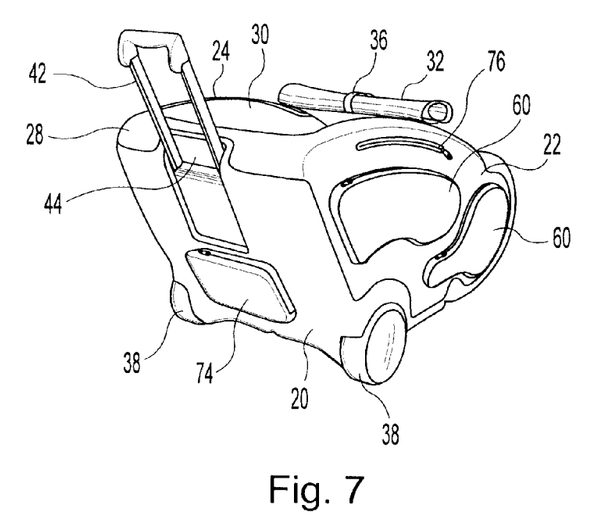
FIG. 7 is a bottom perspective view of the infant carrying system of FIG. 6.
Figure 8:
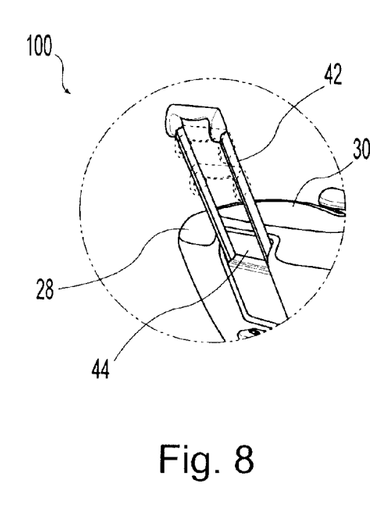
FIG. 8 is a fragmented perspective view of the infant carrying system of FIGS. 6 and 7 showing a stowable pull handle.
Figure 9:
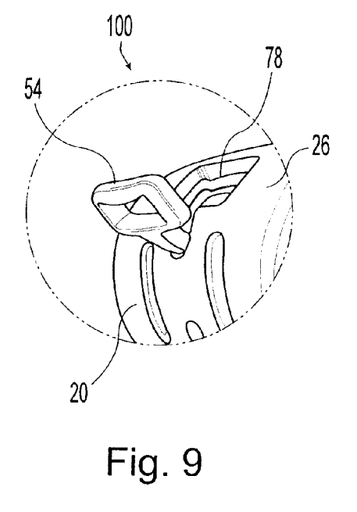
FIG. 9 is a fragmented perspective view of the infant carrying system of FIGS. 6 to 8 showing a stowable front carry handle.
Figure 12:
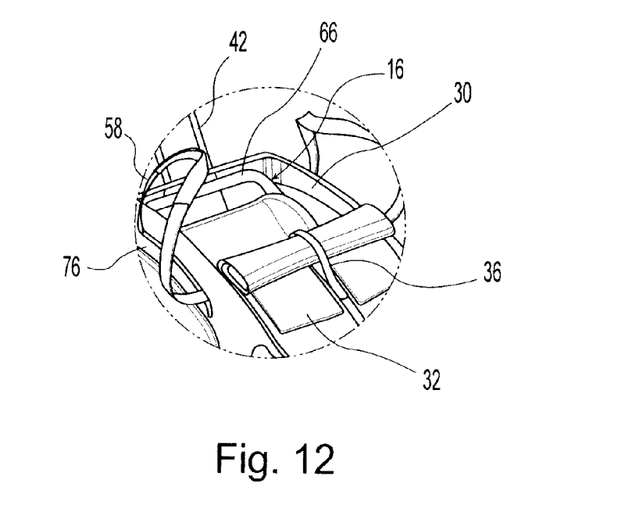
FIG. 12 is a fragmented perspective view of the infant carrying system of FIGS. 6 to 11 showing carry or shoulder straps.

The second embodiment additionally illustrates that more than one side pocket 60 can be utilized and a rear pocket 74 can be utilized (as best shown in FIG. 7). The illustrated sides 22, 24 are also provided with compartments 76 for storing the harness 58 (as best shown in FIG. 12). The second embodiment further illustrates that the carry handle 54 can be retractable and can be located at the front of the bag (as best shown on FIG. 9). The illustrated carry handle 54 is pivotable between extended and retracted or storage positions. The illustrated front end 26 is provided with a recess 78 for receiving the handle 54 when the handle 54 is in its retracted position so that the front end is relatively smooth when the handle 54 is in its retracted position. Moreover, the second embodiment illustrates that the closure 32 can be secured with hook and loop fastener.

Figure 13A:
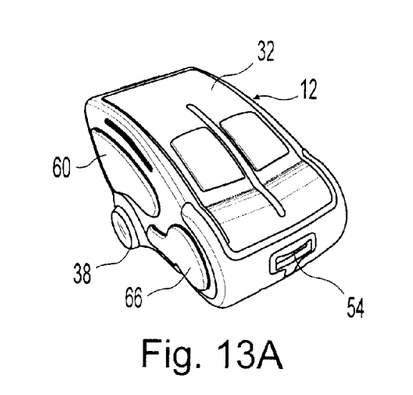
FIGS. 13A to 13E are perspective views of the infant carrying system of FIGS. 6 to 12 showing conversion from a stowable or storage configuration to a infant carrying configuration.
Figure 13B:
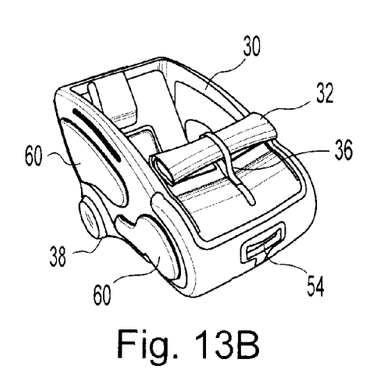
Figure 13C:
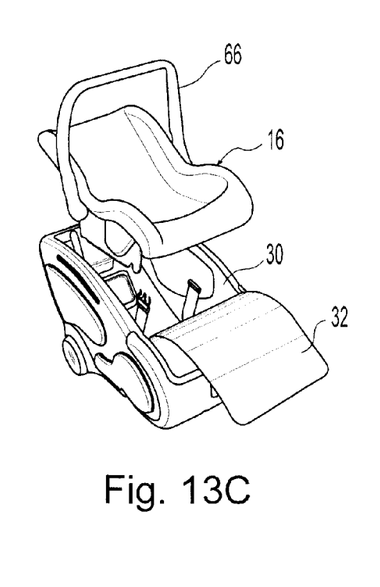
Figure 13D:
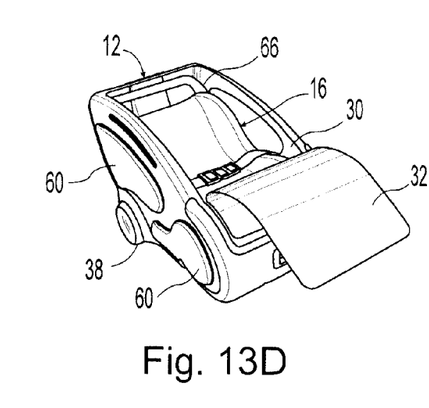
Figure 13E:
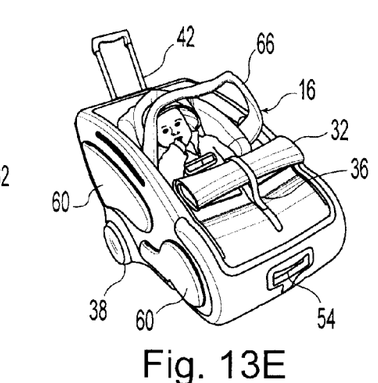

As best shown in FIGS. 13A to 13E, the bag 12 according to the second embodiment is also easily converted from a storage configuration to a use configuration. In the storage configuration, the opening 30 is completely closed by the closure 32. As best shown in FIG. 13B, when the infant carrier system 10 is to be used for carrying a child 18, the closure 32 is opened to expose the opening 30 and the straps of the internal attachment 68 are adjusted to secure the inner frame of the child seat 16. As best shown, in FIG. 13C, the child seat 16 is placed into bag 12 through the opening 30 and is secured to the bag 12 by clasping and adjusting the straps of the attachment 68. As best shown in FIG. 13D, the child seat handle 66 is moved to its storage position to provide access to the child seat 16. As best shown in FIG. 13E, the baby or child 18 is secured in the child seat 16 and the child seat handle 66 is returned to its carrying position for additional safety if desired. Additionally, the pull handle 42 is moved from its retracted to its extended position and the closure 32 is rolled to its desired position and secured by the retainer 36.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An infant carrying system comprising, in combination:
   a bag defining an interior compartment and having an opening for selectively providing access to the interior compartment;
   a pair of wheels rotatably attached to the bag so that the bag can be rolled along the ground;
   a handle attached to the bag to move the bag by rolling the wheels along the ground;
   an attachment for removably securing a child seat at least partially located within the interior compartment and facing the opening;
   whereby the bag is moved while a child is in secured in the child seat;
   wherein at least a portion of the bag is generally flexible, the bag is sized to hold the entire child seat within the interior compartment, and the opening is sized for passage of the child seat therethrough; and
   wherein the bag has a rigid bottom and flexible sides so that the bag can be folded between storage and use configurations.

2. The infant carrying system according to claim 1, wherein the bag includes a closure for selectively opening and closing the opening of the bag.

3. The infant carrying system according to claim 2, wherein the closure comprises a fabric which can be rolled.

4. The infant carrying system according to claim 3, wherein the closure includes a plurality of snaps for securing the rolled closure in a desired position.

5. The infant carrying system according to claim 3, wherein the closure includes a strap for securing the rolled closure in a desired position.

6. The infant carrying system according to claim 1, further comprising a child seat at least partially located within the interior compartment and facing the opening and wherein the child seat is selectively removable from the bag and certified for use in an automobile.

7. The infant carrying system according to claim 1, wherein the bag is provided with shoulder straps.

8. The infant carrying system according to claim 1, wherein the handle is movable between extended and retracted positions.

9. The infant carrying system according to claim 1, wherein the bag is sized to fit within an overhead bin of a commercial airliner.

10. The infant carrying system according to claim 1, wherein the attachment includes a strap with a buckle.

11. The infant carrying system according to claim 1, further comprising a plurality of storage pockets located on exterior surfaces of the bag.

12. The infant carrying system according to claim 1, wherein the opening is formed in the top of the bag, the rolling handle is located at a first end of the bag, and the pair of wheels are located at a second end of the bag opposite the first end of the bag.

13. The infant carrying system according to claim 1, wherein the opening is formed in the top of the bag and the rolling handle and the pair of wheels are each located at a rear end of the bag.

14. An infant carrying system comprising, in combination:
  a bag defining an interior compartment and having an opening for selectively providing access to the interior compartment;
  a pair of wheels rotatably attached to the bag so that the bag can be rolled along the ground;
  a handle attached to the bag to move the bag by rolling the wheels along the ground;
  an attachment for removably securing a child seat at least partially located within the interior compartment and facing the opening;
  whereby the bag is moved while a child is in secured in the child seat; and
  wherein the bag has bottom and sides molded of plastic, the bag is sized to hold the entire child seat within the interior compartment, and the opening is sized for passage of the child seat therethrough.

15. An infant carrying system comprising, in combination:
  a bag defining an interior compartment and having an opening for selectively providing access to the interior compartment;
  a pair of wheels rotatably attached to the bag so that the bag can be rolled along the ground;
  a handle attached to the bag to move the bag by rolling the wheels along the ground;
  an attachment for removably securing a child seat at least partially located within the interior compartment and facing the opening;
  whereby the bag is moved while a child is in secured in the child seat; and
  wherein the pair of wheels are movable between extended and retracted positions.

16. An infant carrying system comprising, in combination:
  a bag defining an interior compartment and having an opening for selectively providing access to the interior compartment;
  a pair of wheels rotatably attached to the bag so that the bag can be rolled along the ground;
  a handle attached to the bag to move the bag by rolling the wheels along the ground;
  an attachment for removably securing a child seat at least partially located within the interior compartment and facing the opening;
  whereby the bag is moved while a child is in secured in the child seat; and
  a stand for supporting the bag in an inclined position and movable between extended and retracted positions.

17. An infant carrying system comprising, in combination:
  a bag defining an interior compartment and having an opening formed in the top of the bag for selectively providing access to the interior compartment;
  wherein the bag has a rigid bottom and flexible sides so that the bag can be folded between storage and use configurations;
  a pair of wheels rotatably attached to a first end of the bag so that the bag can be rolled along the ground;
  wherein the pair of wheels are movable between extended and retracted positions;
  a handle attached to a second end of the bag opposite the first end of the bag to move the bag by rolling the wheels along the ground;
  wherein the handle is movable between extended and retracted positions;
  an attachment for removably securing a child seat at least partially located within the interior compartment and facing the opening; and
  whereby the bag is moved while a child is in secured in the child seat.

18. An infant carrying system comprising, in combination:
  a bag defining an interior compartment and having an opening formed in the top of the bag for selectively providing access to the interior compartment;
  wherein the bag has bottom and sides molded of plastic;
  a pair of wheels rotatably attached to the bag so that the bag can be rolled along the ground;
  a handle attached to the bag to move the bag by rolling the wheels along the ground;
  wherein the handle is movable between extended and retracted positions;
  wherein the handle and the pair of wheels are each located at a rear end of the bag;
  an attachment for removably securing a child seat at least partially located within the interior compartment and facing the opening; and
  whereby the bag is moved while a child is in secured in the child seat.

* * * * *